United States Patent
Wei et al.

(10) Patent No.: US 10,688,615 B2
(45) Date of Patent: Jun. 23, 2020

(54) TEMPERATURE CONTROL SYSTEM AND METHOD THEREOF

(71) Applicant: INDUSTRIAL TECHNOLOGY RESEARCH INSTITUTE, Hsinchu (TW)

(72) Inventors: Shih-Jie Wei, Taichung (TW); Kun-Ying Li, Chiayi (TW); Yan-sin Liao, Taichung (TW); Shi-Jie Luo, Yuanlin (TW); Hsi-Hung Hsiao, Taichung (TW); Szu-Chia Lin, Yilan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 119 days.

(21) Appl. No.: 16/170,519

(22) Filed: Oct. 25, 2018

(65) Prior Publication Data
US 2020/0055158 A1 Feb. 20, 2020

(30) Foreign Application Priority Data
Aug. 15, 2018 (TW) .............................. 107128461 A

(51) Int. Cl.
*B23Q 11/14* (2006.01)
*B23Q 11/12* (2006.01)

(52) U.S. Cl.
CPC .......... *B23Q 11/141* (2013.01); *B23Q 11/127* (2013.01)

(58) Field of Classification Search
CPC ..... B23Q 11/14; B23Q 11/126; B23Q 11/127; B23Q 11/128; B23Q 11/141
See application file for complete search history.

(56) References Cited

U.S. PATENT DOCUMENTS 3,729,064 A * 4/1973 Wolf ...................... B23B 31/26
184/6.14
4,137,997 A * 2/1979 Ando ................... B23Q 11/123
184/6.22

(Continued)

FOREIGN PATENT DOCUMENTS

CN 2587583 Y 11/2003
CN 1175960 C 11/2004

(Continued)

OTHER PUBLICATIONS

Jung, Young-Mi et al., A Study on High Precision Temperature Control of an Oil Cooler for Machine Tools Using Hot-gas Bypass Method, Journal of the Korean Society of Marine Engineers, 2009, vol. 33, No. 7.

(Continued)

*Primary Examiner* — Nelson J Nieves
(74) *Attorney, Agent, or Firm* — Locke Lord LLP; Tim Tingkang Xia, Esq.

(57) ABSTRACT

This disclosure relates to a temperature control system that may be applied to a machine tool. The system includes a cooling circulation and a controller. The cooling circulation comprises a pump, a cooler and a solenoid valve. The pump may be driven by a variable frequency motor so as to flow through the spindle of the machine tool. The cooler is serially connected with the liquid pump, and may cool the liquid coolant. The solenoid valve connects to inlet and outlet of the cooler, and may prevent the liquid coolant flows through the spindle from flowing back to the cooler. The controller is electrically connected with the variable frequency motor, the cooler and the solenoid valve. Further, the controller is connected to the machine tool to detect several parameters, so as to control the variable frequency motor, the cooler and the solenoid valve.

11 Claims, 6 Drawing Sheets

(56) References Cited

U.S. PATENT DOCUMENTS

| | | | |
|---|---|---|---|
| 5,040,379 A | 8/1991 | Fukunaga et al. | |
| 5,197,537 A | 3/1993 | Chigira et al. | |
| 6,089,797 A * | 7/2000 | Chen | B23Q 11/141 165/206 |
| 6,779,354 B2 * | 8/2004 | Nakata | B23Q 11/141 62/180 |
| 9,267,746 B2 | 2/2016 | Welsch | |
| 2008/0078620 A1 * | 4/2008 | Yanohara | B23Q 11/123 184/6.14 |
| 2008/0111290 A1 * | 5/2008 | Jensen | B23Q 11/141 269/21 |
| 2011/0154835 A1 * | 6/2011 | Miyamoto | B23Q 11/126 62/64 |
| 2014/0010611 A1 * | 1/2014 | Yamanishi | B23Q 11/126 409/135 |
| 2016/0121445 A1 * | 5/2016 | Sogabe | B23Q 11/127 |
| 2018/0043491 A1 * | 2/2018 | Nakamura | B23Q 5/10 |
| 2019/0047104 A1 * | 2/2019 | Liao | G05B 19/404 |
| 2019/0118323 A1 * | 4/2019 | Koshiishi | B23Q 11/128 |
| 2019/0255672 A1 * | 8/2019 | Arai | B23Q 11/146 |
| 2019/0270170 A1 * | 9/2019 | Arai | B23Q 11/127 |

FOREIGN PATENT DOCUMENTS

| | | | |
|---|---|---|---|
| EP | 1927431 A1 | 6/2008 | |
| JP | 61044554 A * | 3/1986 | B23Q 11/127 |
| JP | H04372328 A | 12/1992 | |
| JP | 5329743 B2 | 10/2013 | |
| TW | 529509 U | 4/2003 | |
| TW | 567927 U | 12/2003 | |
| TW | M299044 U | 10/2006 | |
| TW | 201016379 A | 5/2010 | |
| TW | I328077 B | 8/2010 | |
| TW | I340058 B | 4/2011 | |
| TW | I444796 B | 7/2014 | |
| TW | M541918 U | 5/2017 | |
| TW | I593501 B | 8/2017 | |
| TW | I628035 B | 7/2018 | |

OTHER PUBLICATIONS

Chi-Huang Lu et al., Adaptive Predictive Control With Recurrent Neural Network for Industrial Processes: An Application to Temperature Control of a Variable-Frequency Oil-Cooling Machine, IEEE Transactions on Industrial Electronics, 2008, vol. 55, No. 3.

Bryan, J., International status of thermal error research (1990), CIRP Annals—Manufacturing Technology, 1990, 39, 645-656.

Comparison of system performance on hot-gas bypass and variable speed compressor in an oil cooler for machine tools, Journal of Mechanical Science and Technology, 2014, 721-727, 28(2).

Kuei-I Tsai et al., Design and experimental evaluation of robust PID and PI-PD temperature controllers for oil-cooling machines, Proceedings of the 8th World Congress on Intelligent Control and Automation, 2011, Taipei, Taiwan.

Ikuo Tanabe et al., Dual Cooling Jacket around Spindle Bearings with Feed-Forward Temperature Control System to Decrease Thermal Deformation, JSME international journal. Ser. C, Dynamics, control, robotics, design and manufacturing, 1996.

Ching-Chih Tsai et al., Stochastic model reference predictive temperature control with integral action for an industrial oil-cooling process, Control Engineering Practice, 2009, 17, 302-310.

Mayr, Josef et al., Thermal issues in machine tools, CIRP Annals—Manufacturing Technology, 2012, 61, 771-791.

Ching-Chih Tsai et al., Model reference adaptive predictive control for a variable-frequency oil-cooling machine, IEEE Transactions on Industrial Electronics, 2004, vol. 51, No. 2.

Taiwan Patent Office, "Office Action", dated Nov. 8, 2018, Taiwan.

Warren M. Rohsenow et la., Heat transfer, McGraw-Hill, 1989.

* cited by examiner

TEMPERATURE CONTROL SYSTEM AND METHOD THEREOF

CROSS-REFERENCE TO RELATED APPLICATIONS

This non-provisional application claims priority under 35 U.S.C. § 119(a) on Patent Application No(s). 107128461 filed in Taiwan, R.O.C. on Aug. 15, 2018, the entire contents of which are hereby incorporated by reference.

TECHNICAL FIELD

The disclosure relates to a temperature control system and a method thereof.

BACKGROUND

During the operation of a machine tool, a spindle of the machine tool generates heat, and the heat might cause the spindle to deform (i.e., thermal deformation), thus the machine tool is usually equipped with a temperature control system for controlling the temperature of the spindle at a certain level. In detail, the temperature control system covers most parts of the spindle with a cooling jacket and creates a liquid coolant circulation in the cooling jacket so as to control the temperature of the spindle.

SUMMARY

One embodiment of the present disclosure relates to a temperature control system that may be applied to a machine tool. The temperature control system includes a cooling circulation and a controller. The cooling circulation includes a pump, a cooler and a solenoid valve. The pump is driven by a variable frequency motor so as to drive a liquid coolant to flow in the cooling circulation and to flow through a spindle of the machine tool. The cooler is serially connected with the pump and may cool the liquid coolant. The solenoid valve is connected to an inlet and an outlet of the cooler. When the solenoid valve is turned on, it prevents the liquid coolant flows through the spindle from flowing back to the cooler. The controller is electrically connected with the variable frequency motor, the cooler and the solenoid valve. Moreover, the controller is connected to the machine tool to detect a spindle load, a spindle speed, a spindle temperature and a body temperature of the machine tool so as to control the variable frequency motor, the cooler and the solenoid valve.

One embodiment of the present disclosure relates to a temperature control method which may be applied to a temperature control system. The temperature control system includes a cooler, a pump, a variable frequency motor and a solenoid valve. The variable frequency motor drives the pump. Then, the pump drives a liquid coolant to flow through a spindle of a machine tool. The temperature control method includes: detecting a spindle load, a spindle speed, a spindle temperature and a body temperature; controlling a cooler to reduce a temperature reduction of the liquid coolant according to a temperature difference between the spindle temperature and the body temperature; and calculating a speed of the variable frequency motor using a regression equation according to the spindle load, the spindle speed and the temperature difference so as to control a flow rate of the liquid coolant.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Figure 1:
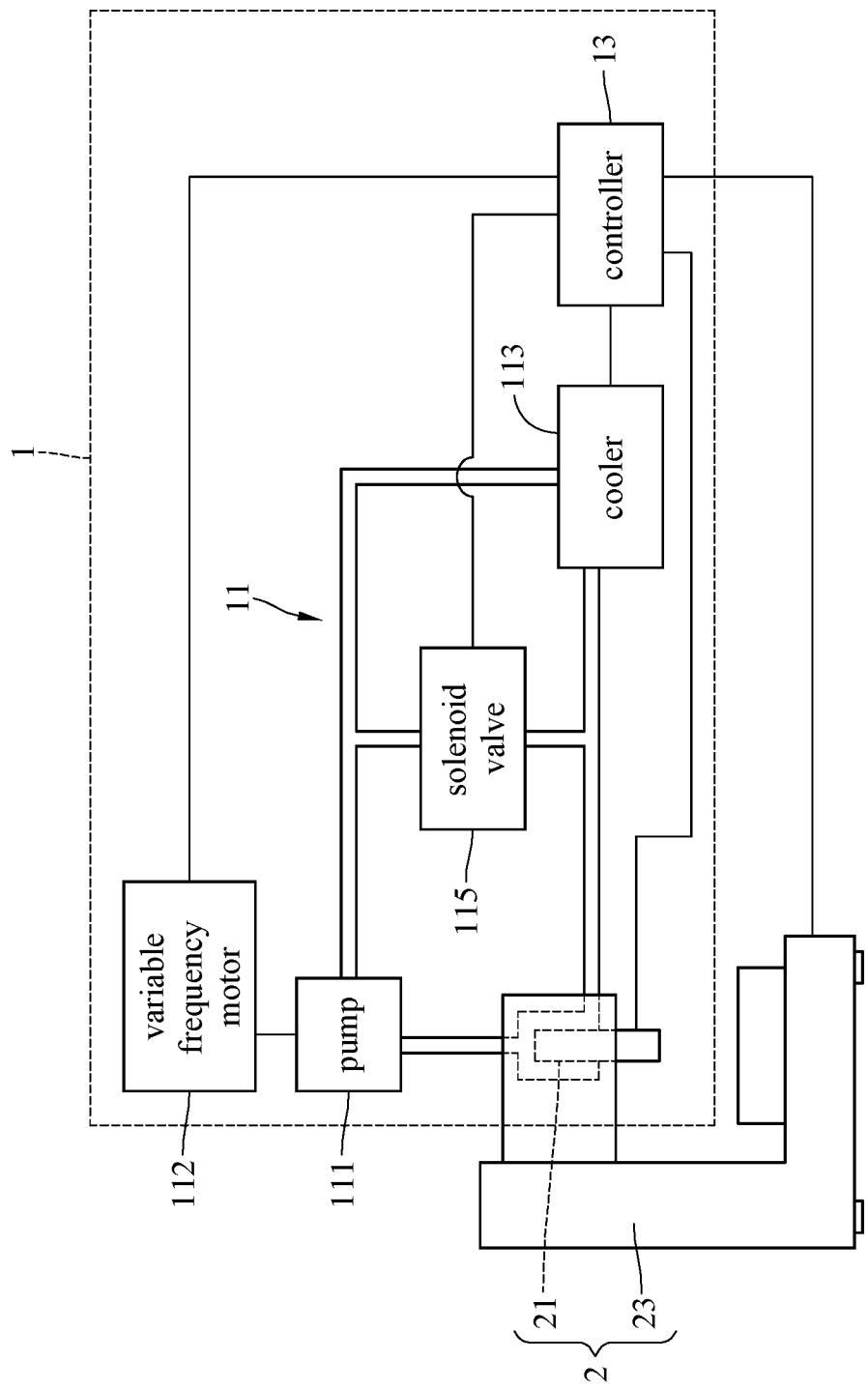
FIG. 1 is a functional block diagram of a temperature control system according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, FIG. 1 is a functional block diagram of a temperature control system according to one embodiment of the disclosure. As shown in FIG. 1, a temperature control system 1 is adapted for a machine tool 2. The temperature control system 1 includes a cooling circulation 11 and a controller 13. The cooling circulation 11 contains liquid coolant and can supply the liquid coolant to a spindle 21 of the machine tool 2 in order to adjust the temperature of the spindle (also can be referred as "spindle temperature"). Although FIG. 1 only illustrates a simplified relationship between the cooling circulation 11 and the spindle 21, the actual connection and design details thereof should be determined according to actual requirements, and the disclosure is not limited thereto.

The cooling circulation 11 includes a pump 111, a cooler 113 and a solenoid valve 115. The cooler 113 and the pump 111 are serially connected to each other, and the solenoid valve 115 is connected to an inlet and an outlet of the cooler 113. The pump 111 is able to be driven by a variable frequency motor 112 so as to drive the liquid coolant to flow in the cooling circulation 11 and to flow through the spindle 21 of the machine tool 2. In detail, the variable frequency motor 112 drives the pump 111 to push the liquid coolant. The cooler 113 may include a compressor, a bypass valve, an evaporator, an expansion valve and a condenser, such that the cooler 113 is able to cool the liquid coolant that enters into the cooler 113. Wherein the detailed cool method is the same as that of a general cooler so it is omitted here.

The solenoid valve 115 is configured to hold part of the liquid coolant in the cooler 113. In detail, when the solenoid valve 115 is turned on (i.e. opened), the potential energy of the liquid coolant in the part of the cooling circulation 11 between the pump 111 and the solenoid valve 115 is lower than the potential energy of the liquid coolant in another part of the cooling circulation 11 between the pump 111 and the cooler 113. The flow resistance decreases as the potential energy decreases, and thus only the liquid coolant in the part of the cooling circulation 11 between the pump 111 and the solenoid valve 115 flows and forms a sub circulation, such that the liquid coolant in the cooler 113 stays in the cooler 113. In other words, when the solenoid valve 115 is turned on, the liquid coolant flowing through the spindle 21 of the machine tool 2 does not flow through the cooler 113 again. In contrary, when the solenoid valve 115 is turned off (i.e. closed), the liquid coolant is circulated over the pump 111 and the cooler 113, and the liquid coolant flowing through the spindle 21 of the machine tool 2 is continuously cooled by the cooler 113.

The controller 13 is electrically connected to and controls the variable frequency motor 112, the cooler 113 and the solenoid valve 115. The controller 13 may include a temperature sensor, load sensor, and speed sensor, and the controller 13 is connected to the spindle 21 and a casing 23 of the machine tool 2 so as to detect the operating parameters such as the spindle load, spindle speed, spindle temperature, and body temperature. The controller 13 also includes a central processing unit (CPU), microcontroller unit (MCU) or the like for controlling the variable frequency motor 112, the cooler 113 and the solenoid valve 115 according to the aforementioned operating parameters.

Figure 2:
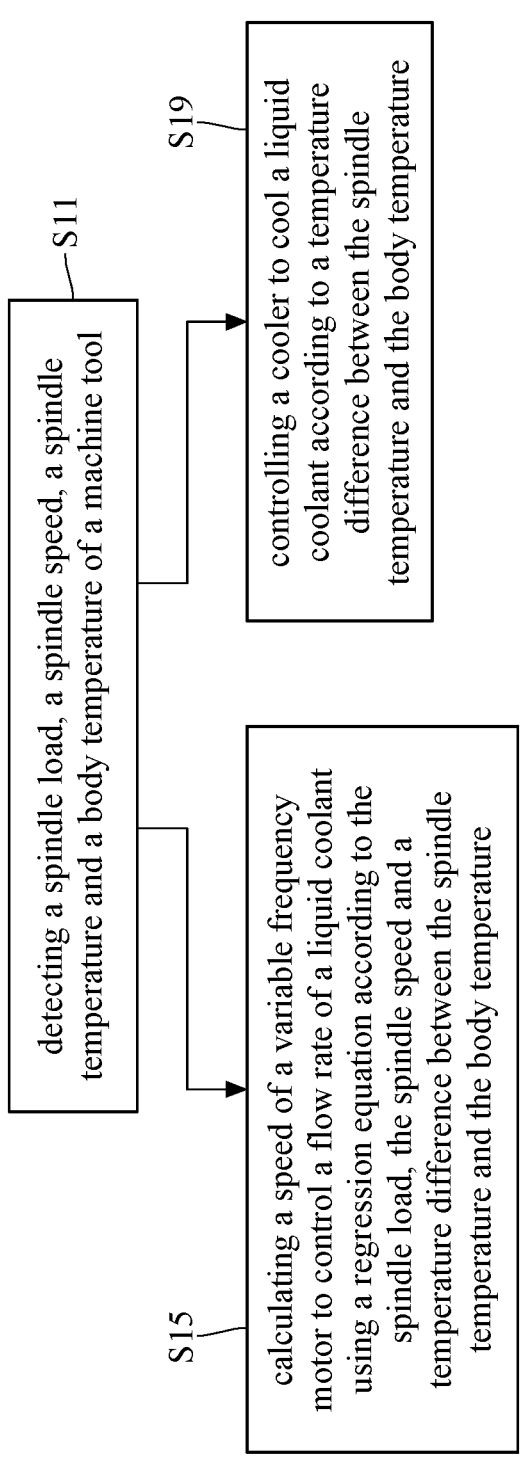
FIG. 2 is a flow chart of a temperature control method according to one embodiment of the disclosure.

Please refer to FIG. 1 and FIG. 2 to further illustrate how the controller 13 controls the variable frequency motor 112, the cooler 113 and the solenoid valve 115, wherein FIG. 2 is a flow chart of a temperature control method according to one embodiment of the disclosure. The temperature control method is adapted to the temperature control system 1 in FIG. 1. As shown in FIG. 2, in step S11, the controller 13 of the temperature control system 1 detects the operating parameters of the machine tool 2 such as the spindle load, spindle speed, spindle temperature and body temperature. Then, in step S15 and step S19, the cooler 113 and the variable frequency motor 112 are controlled according to one or more of the operating parameters. Specifically, in step S15, the controller 13 calculates the speed of the variable frequency motor 112 using a regression equation according to the spindle load, the spindle speed and a temperature difference between the spindle temperature and the body temperature in order to control a flow rate of the liquid coolant in the cooling circulation 11. In detail, the said regression equation involves the operating parameters such as the spindle load, spindle speed and spindle temperature, and the regression equation is, for example, denoted by the following equation:

$$F=2\times10^{-7}\times R^2+1\times10^{-3}\times R+0.1\times L+B+5C$$

where F denotes the desired operating frequency of the variable frequency motor 112 (unit: Hz), R denotes the spindle speed (unit: rpm), L denotes the spindle load (unit: %), B denotes the lowest frequency of the variable frequency motor 112 (unit: Hz), and C denotes the temperature difference between the spindle temperature and the body temperature.

Figure 3:
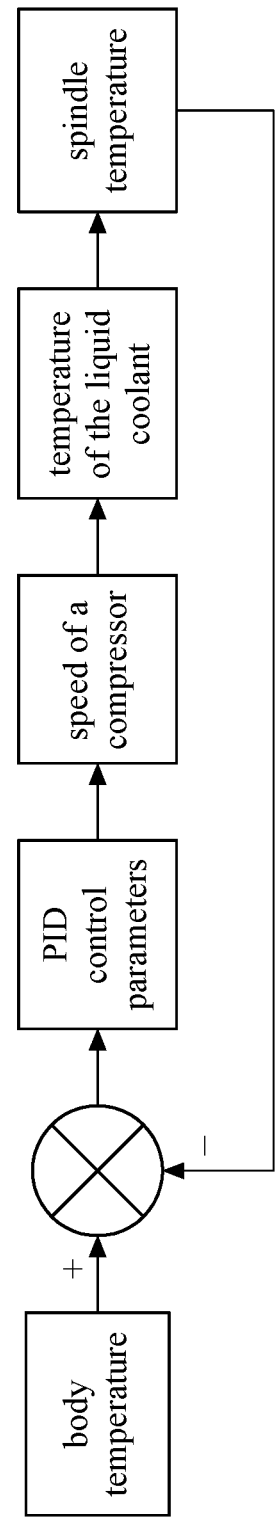
FIG. 3 is a schematic diagram of a PID control in the temperature control method according to one embodiment of the disclosure.

In one embodiment, the controller 13 of the temperature control system 1 may contain various databases storing various regression equations for various machine tools. In step S19, the controller 13 controls the cooler 113 to reduce the temperature of the liquid coolant according to the temperature difference between the spindle temperature and the body temperature. In detail, the controller 13 may adjust the cooling level of the cooler 113 using a proportional-integral-derivative (PID). Please refer to FIG. 3, FIG. 3 is a schematic diagram of a PID control in the temperature control method according to one embodiment of the disclosure, the controller 13 calculates the temperature difference between the spindle temperature and the body temperature, and then controls the speed of the compressor of the cooler 113 by calculating the PID control parameters so as to adjust the temperature of the liquid coolant, thereby adjusting the spindle temperature. Accordingly, the controller 13 is able to control the spindle temperature and make it close to the body temperature so as to maintain the machine tool 2 in an ideal working condition by the feedback loop shown in FIG. 3. In another embodiment, the controller 13 may also control the bypass valve of the cooler 113 to adjust the temperature of the liquid coolant by using the PID control.

By the step S15, the controller 13 controls the variable frequency motor 112 to adjust the flow rate of the liquid coolant according to the operating parameters of the machine tool 2; and by the step S19, the controller 13 controls the cooler 113 to adjust the temperature of the liquid coolant according to the operating parameters of the machine tool 2. Accordingly, the condition in the prior arts that controls the liquid coolant at a fixed temperature and flow rate and make the thermal error vary with the load can be prevented. In addition, the disclosure is not limited to the order of performing the steps S15 and S19, the steps S15 and S19 can be performed simultaneously and can also be performed asynchronously.

Figure 4:
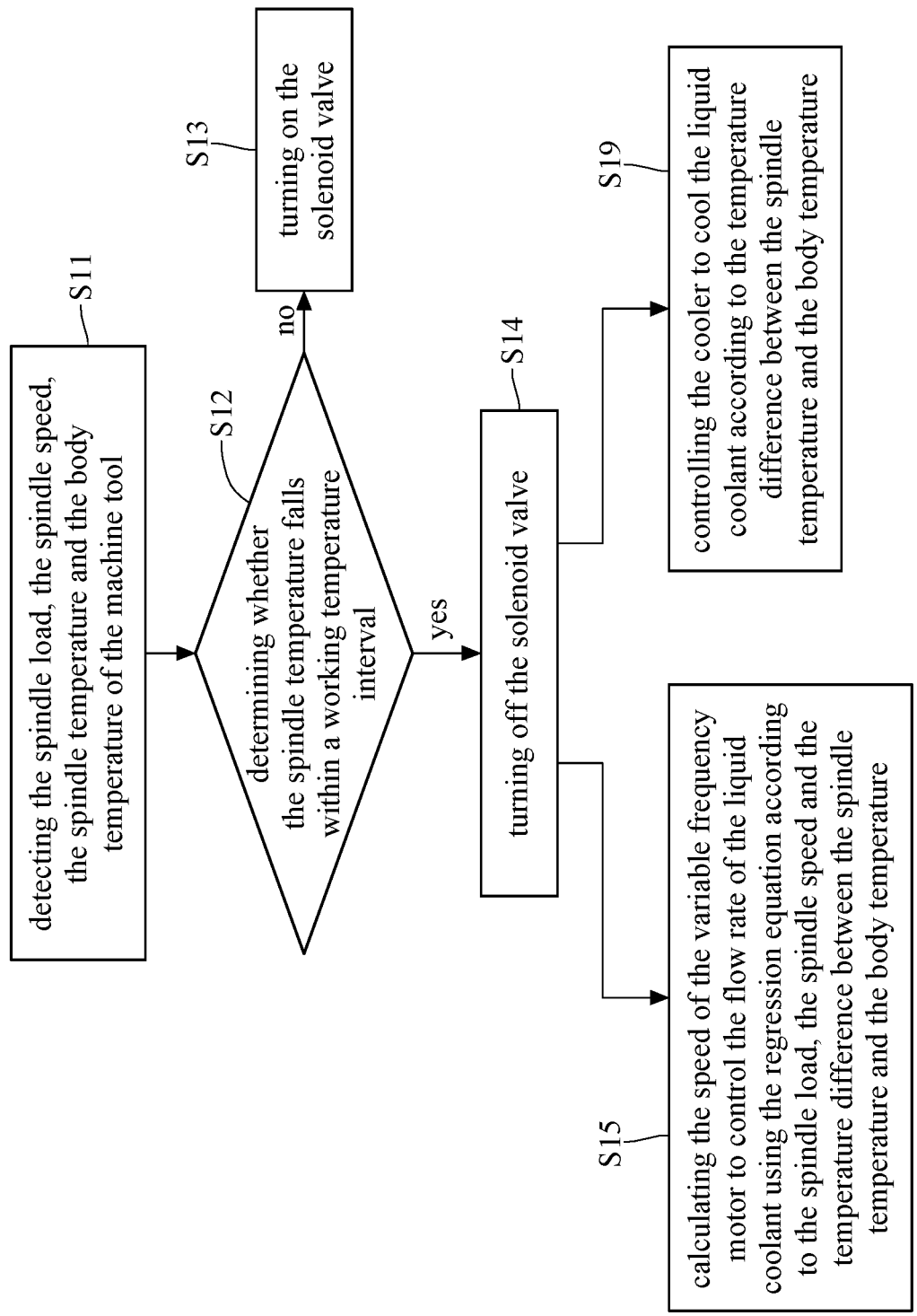
FIG. 4 is a flow chart of a temperature control method according to another embodiment of the disclosure.

Next, please refer to FIG. 1 and FIG. 4 to illustrate a temperature control method according to another embodiment of the disclosure. Similarly, FIG. 4 shows a flow chart of the temperature control method which is also adapted to the temperature control system 1 in the FIG. 1. As shown in steps S11, S15 and S19, the controller 13 also can detect the operating parameters of the machine tool 2 and adjust the flow rate and temperature of the liquid coolant. The difference from the previous embodiment is that this embodiment further includes a few steps between the steps S11 and the steps S15 and S19. Specifically, after the step S11, there is a step S12 to indicate the controller 13 to determine whether the detected spindle temperature falls within a working temperature interval, wherein the said working temperature interval is related to the detected body temperature. In detail, in one embodiment, the working temperature interval may be a temperature range that is larger than or equal to the temperature range of the body temperature. In another embodiment, the working temperature interval may be a temperature range that is larger than or equal to the sum of the range of the body temperature and a machine tool characteristic variable. For instance, the machine tool characteristic variable is approximately between 2 degrees Celsius and 3 degrees Celsius. Further, the machine tool characteristic variable of a smaller machine tool is approximately 2 degrees Celsius, and the machine tool characteristic variable of a larger machine tool is approximately 3 degrees Celsius.

When the spindle temperature is determined to be falling outside the working temperature interval, a step S13 is performed to turn on the solenoid valve 115 so that the liquid coolant is held in the cooler 113. In detail, when the spindle temperature of the machine tool 2 falls outside the said working temperature interval, it means that the warm-up of the machine tool 2 is not yet completed. In the conventional temperature control method that controls the temperature at fixed temperature and flow rate, despite the warm-up of the machine tool is not completed, the liquid coolant cooled by the cooler is still continuously supplied to the spindle of the machine tool, which prolongs the time for the warm-up. In the temperature control method disclosed by the aforementioned embodiment of the disclosure, when the spindle temperature of the machine tool 2 is determined to be falling outside the working temperature interval, the solenoid valve 115 is turned on so that the liquid coolant is only pumped through the pump 111 and the solenoid valve 115, and the liquid coolant does not flow to the cooler 113, which helps to shorten the time for the warm-up and is energy saving.

In other hand, when the spindle temperature is determined to be falling inside the working temperature interval, a step S14 is performed to turn off the solenoid valve 115 so that the liquid coolant is allowed to flow to the cooler 113. In other words, when the controller 13 determines that the machine tool 2 completes the warm-up, the controller 13 turns off the solenoid valve 115 and allows the liquid coolant flow to be pumped to the cooler 113 and then to be supplied to the spindle of the machine tool 2 for cooling the spindle.

Next, the steps S15 and S19 are then performed. The steps S15 and S19 are the same as that discussed in the previous embodiment, thus the detailed descriptions thereof are not repeated herein.

Figure 5A:
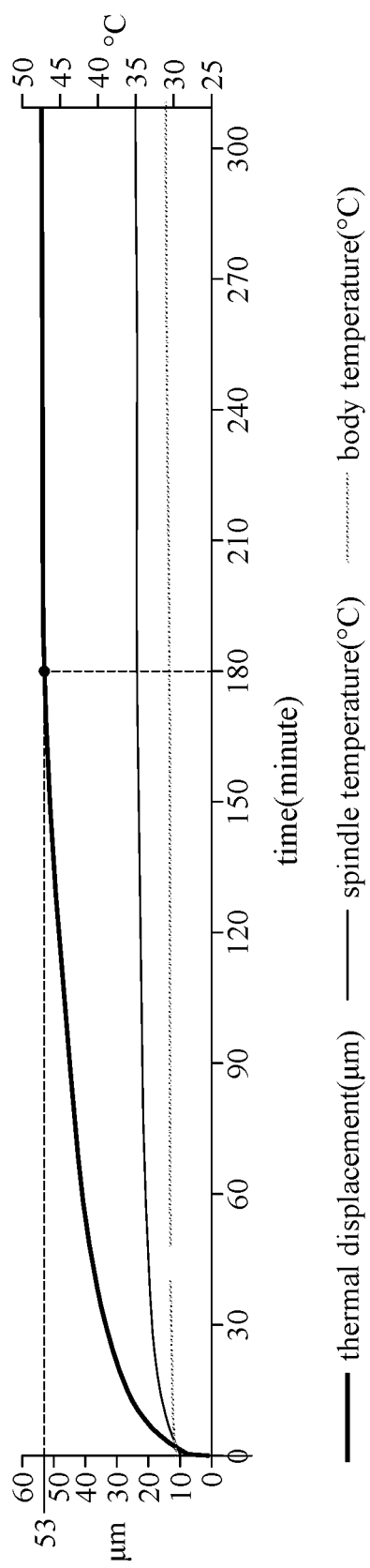
FIG. 5A is an operating parameters diagram detected by using a conventional temperature control method to control a machine tool.
Figure 5B:
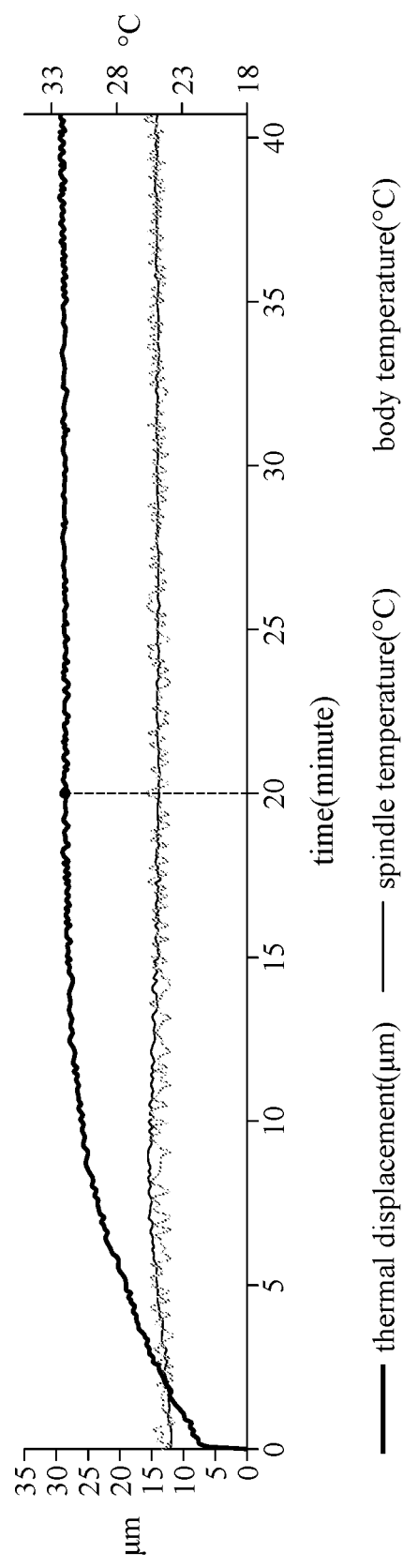
FIG. 5B is an operating parameters diagram detected by using the temperature control method provided by one embodiment of the disclosure to control the machine tool.

Comparing to the conventional temperature control method, the temperature control method provided by FIG. 4 can make the spindle 21 of the machine tool 2 reaching a thermal equilibrium faster and have a shorter thermal extension. Please refer to FIGS. 5A and 5B, wherein FIG. 5A is an operating parameters diagram detected by using a conventional temperature control method to control a machine tool, and FIG. 5B is an operating parameters diagram detected by using the temperature control method shown in FIG. 4 to control the machine tool. The machine tools utilized to obtain the diagrams in FIG. 5A and FIG. 5B are horizontal machining centers that can operate at a speed of 12500 rpm. It is noted that the results shown in FIGS. 5A and 5B are exemplary and not used to limit the actual data that can be obtained by the temperature control method provided by the disclosure.

As shown in FIG. 5A, the temperature of the machine tool is controlled by a conventional temperature control method, the spindle costs about 3 hours to reach the thermal equilibrium after being activated, and the spindle has a thermal displacement of about 53 μm. As shown in FIG. 5B, the machine tool utilizes the temperature control method shown in FIG. 4 so that the temperature of the spindle only costs about 20 minutes to reach the thermal equilibrium, and the thermal displacement of the spindle is decreased to about 29 μm. This shows that the temperature control method in FIG. 4 is able to help the spindle of the machine tool to reach the thermal equilibrium faster and to have a smaller thermal displacement, thereby achieving a higher machining accuracy.

Figure 6:
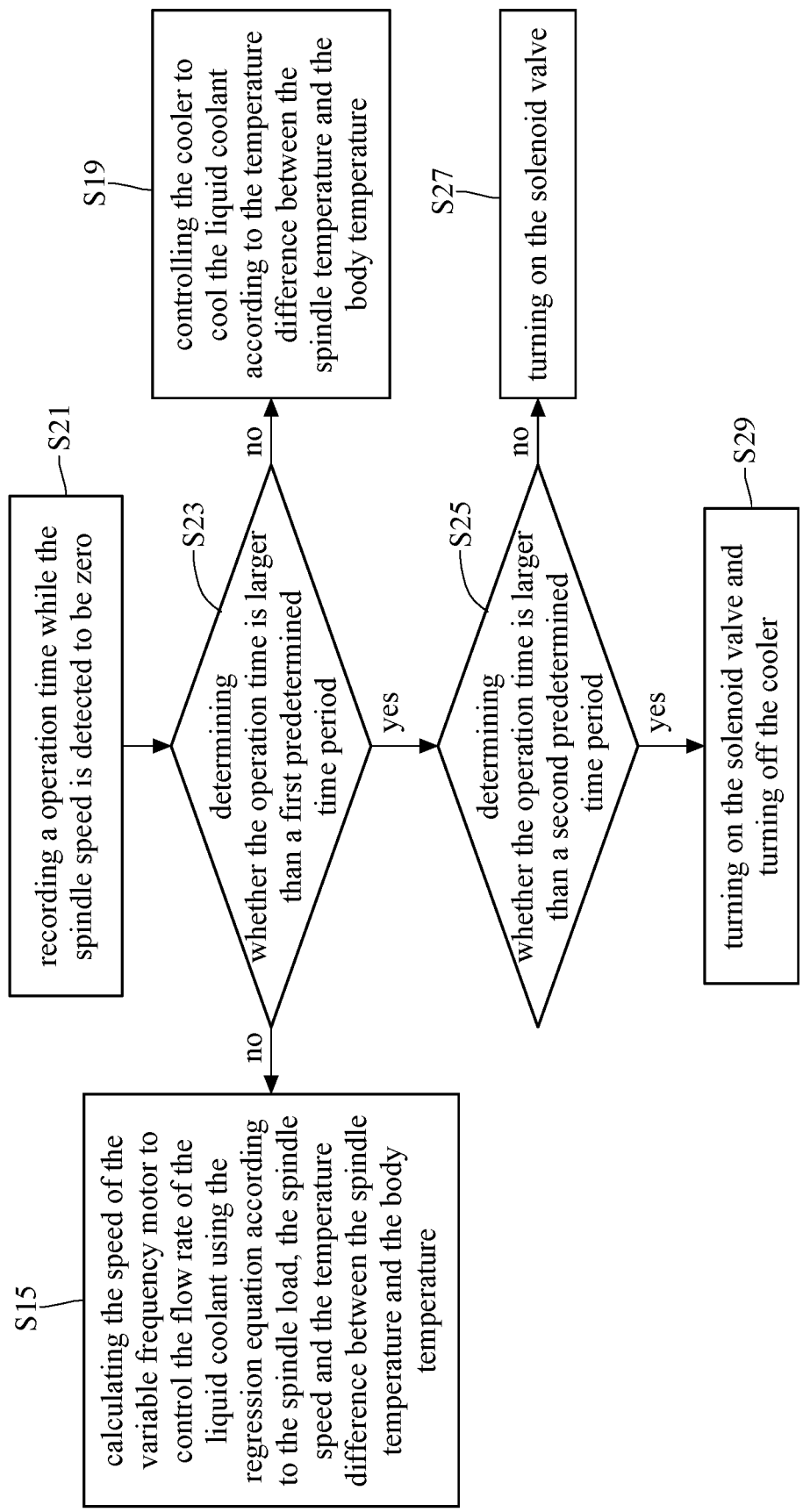
FIG. 6 is a flow chart of a temperature control method according to still another embodiment of the disclosure.

Moreover, the temperature control system 1 is also able to adjust the circulation path of the liquid coolant under other operation stage of the machine tool 2. Please refer to FIG. 1 and FIG. 6, wherein FIG. 6 is a flow chart of a temperature control method according to still another embodiment of the disclosure. This embodiment provides a step S21, the step S21 is to record the operation time of a specific stage of the machine tool 2 when the controller 13 of the temperature control system 1 determines that the spindle speed of the machine tool 2 is equal to zero.

In one embodiment, the controller 13 stores a predetermined time period. When the controller 13 determines that the operation time for the speed of the spindle of the machine tool 2 stays at zero is not longer than the predetermined time period, the controller 13 keeps performing the steps S15 and S19 for the liquid coolant. When the controller 13 determines that the operation time for the speed of the spindle of the machine tool 2 stays at zero is longer than the predetermined time period, the controller 13 turns on the solenoid valve 115 so that the liquid coolant flowing through the spindle 21 is not pumped to the cooler 113 to be cooled.

In another embodiment, the controller 13 stores a first predetermined time period and a second predetermined time period, and the second predetermined time period is longer than the first predetermined time period. In step S23, the controller 13 determines whether the operation time for the speed of the spindle of the machine tool 2 stays at zero is longer than the first predetermined time period. When the controller 13 determines that the said operation time is not longer than the first predetermined time period, the controller 13 keeps performing the steps S15 and S19. When the operation time is longer than the first predetermined time period, the controller 13 is then performs step S25 to further determine whether the operation time is longer than the second predetermined time period. When the operation time is determined to be between the first predetermined time period and the second predetermined time period, a step S27 is performed to indicate the controller 13 to turn on the solenoid valve 115 so that the liquid coolant is restricted to be circulated between the pump 111 and the solenoid valve 115. When the operation time is determined to be longer than the second predetermined time period, a step S29 is performed to indicate the controller 13 to turn on the solenoid valve 115 and turn off the cooler 113.

In the conventional temperature control method, the liquid coolant being cooled by the cooler is continuously supplied to the spindle of the machine tool even when the spindle has been stopped for the loading/unloading procedure, causing the spindle temperature to be lower than the body temperature. As a result, the spindle and the workpiece is overcool.

In contrast, in the temperature control method provided by the aforementioned embodiments of the disclosure, the first predetermined time period is a reference for determining whether the machine tool 2 is in a loading/unloading state (i.e. the operation time while the spindle speed is zero is longer than the first predetermined time period), so that it is able to stop supplying the liquid coolant to the spindle when the machine tool 2 is in the loading/unloading state.

Further, the controller 13 is able to determine whether the machine tool 2 is in a short loading/unloading state or a long loading/unloading state according to the second predetermined time period. In detail, when the operation time is determined to be between the first predetermined time period and the second predetermined time period, the controller 13 determines that the machine tool 2 is in the short loading/unloading state, thus the controller 13 turns on the solenoid valve 115 to prevent the temperature of the spindle from being decreased by the liquid coolant; when the operation time is determined to be longer than the second predetermined time period, the controller 13 determines that the machine tool 2 is in the long loading/unloading state, and thus there is no need to cool the liquid coolant so that the cooler 113 is turned off, which is energy saving.

In this embodiment, the first predetermined time period is, for example, approximately between 30 seconds and 2 minutes, and the second predetermined time period is, for example, approximately between 10 minutes and 30 minutes. Additionally, it is understood that the small mechanic tool may have a shorter predetermined time period than the large one.

Figure 7:
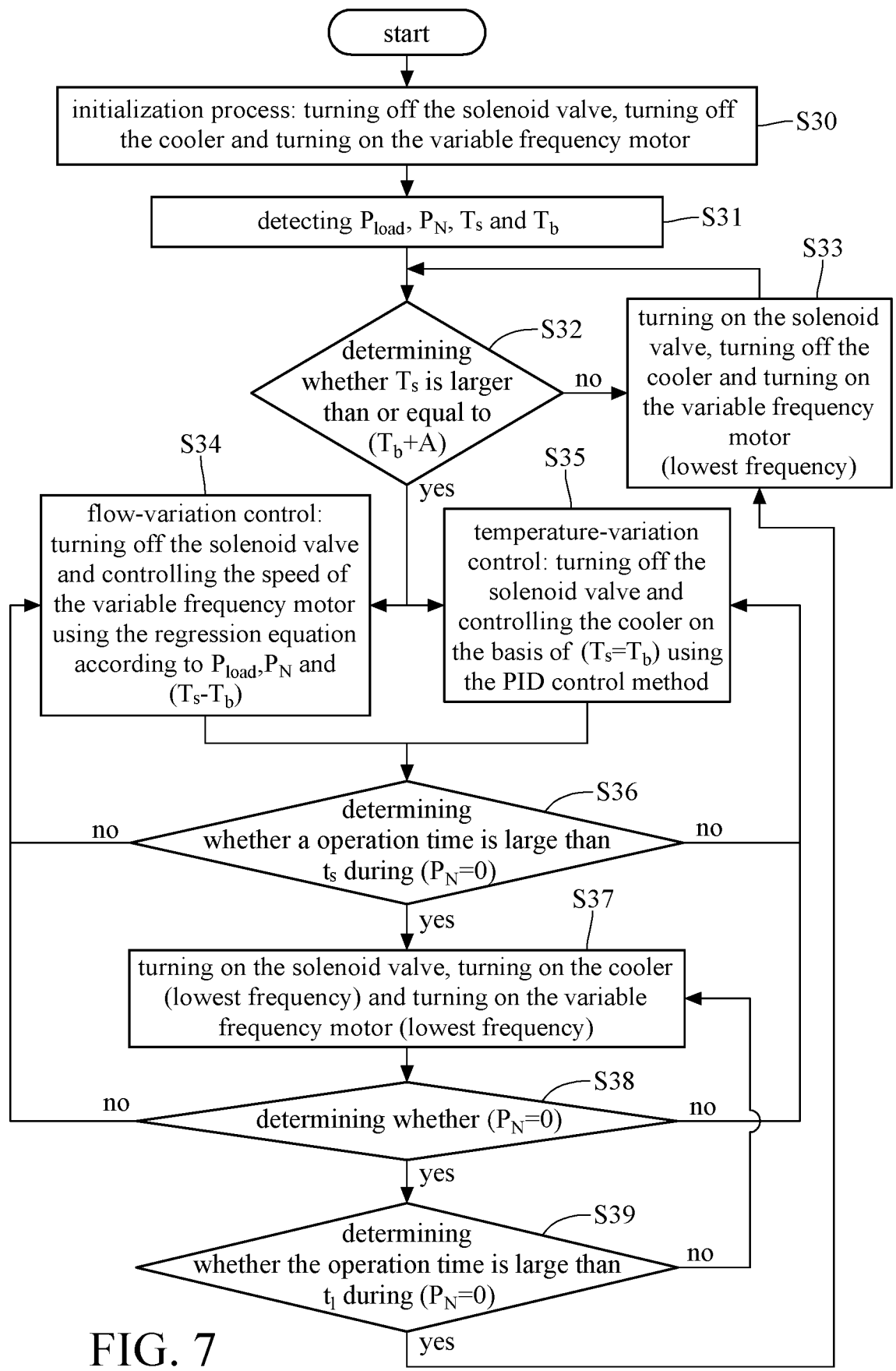
FIG. 7 is a flow chart of a temperature control method according to still yet another embodiment of the disclosure.

Next, please refer to FIG. 1 and FIG. 7, wherein FIG. 7 is a flow chart of a temperature control method according to still yet another embodiment of the disclosure. This temperature control method in this embodiment is also adapted to the temperature control system 1 in FIG. 1. As shown in FIG. 7, in step S30, when the temperature control system 1 is turned on, the controller 13 performs an initialization process, the initialization process includes turning off the solenoid valve 115, turning off the cooler 113, and turning on the variable frequency motor 112. Then, in step S31, the controller 13 performs the detection of the operating parameters of the machine tool 2 and stores them in the database, wherein the operating parameters include the spindle load $P_{load}$, the spindle speed $P_N$, the spindle temperature $T_s$, and the body temperature $T_b$. In step S32, the controller 13 determines whether the spindle temperature $T_s$ is larger than or equal to the sum of the body temperature $T_b$ and the machine tool characteristic variable A, wherein the machine tool characteristic variable A is, for example, approximately between 2 degrees Celsius and 3 degrees Celsius.

When the spindle temperature $T_s$ is smaller than the value of the sum, it means that the warm-up of the machine tool 2 is not yet completed. At this moment, step S33 is performed to indicate the controller 13 to turn on the solenoid valve 115, to turn off the cooler 113, and to indicate the variable frequency motor 112 to operate at the lowest frequency. When the spindle temperature $T_s$ is larger than or equal to the value of the sum, it means that the warm-up of the machine tool 2 is completed. At this moment, the controller 13 turns off the solenoid valve 115, turns on the cooler 113, and performs the control at a fixed temperature and flow rate. As shown in step S34, during the flow-variation control, the controller 13 controls the speed of the variable frequency motor 112 using the regression equation according to the spindle load $P_{load}$, the spindle speed $P_N$ and the temperature difference $(T_s-T_b)$ between the spindle temperature $T_s$ and the body temperature $T_b$ in order to control the flow variation of the liquid coolant. The regression equation is similar to that in the step S15 in the previous embodiments, thus the detail descriptions thereof are not repeated herein. Then, as shown in step S35, during the temperature-variation control, the controller 13 controls the cooling level of the cooler 113 on the basis of $(T_s-T_b)$ using the PID control method. The PID control method is the same as that in the previous embodiments, thus the detail descriptions thereof are not repeated herein.

During the flow-variation and temperature-variation controls, the controller 13 keeps detecting the operating parameters of the machine tool 2 in order to timely adjust the variable frequency motor 112 and the cooler 113. In step S36, when the controller 13 determines that the spindle speed $P_N$ of the machine tool 2 is zero, the controller 13 records the operation time of the current state and determines whether it is longer than a short unloading period $t_s$. When the operation time is determined to be not longer than the short unloading period $t_s$, the controller 13 keeps performing the flow-variation control (S34) and temperature-variation control (S35). When the operation time is determined to be longer than the short unloading period $t_s$, the controller 13 determines that the machine tool 2 is in the loading/unloading state, and the controller 13 then turns on the solenoid valve 115 and indicates the cooler 113 and the variable frequency motor 112 to operate at the lowest frequency (S37).

Next, in step S38, the controller 13 detects and determines whether the spindle speed $P_N$ of the machine tool 2 is zero. When the spindle speed $P_N$ is determined to be not zero, it means that the machine tool 2 completes the loading/unloading process and begins to operate, and the controller 13 then performs the flow-variation control (S34) and temperature-variation control (S35). When the spindle speed $P_N$ is determined to be zero, the controller 13 determines whether the operation time while the zero spindle speed $P_N$ is zero is longer than the long unloading period $t_1$ (S39). When the operation time is determined to be not longer than the long unloading period $t_1$, the step S37 is performed again. When the operation time is determined to be longer than the long unloading period $t_1$, the step S33 is performed again, such that the cooler 113 is being turned off.

According to the temperature control system and the control method thereof as discussed above, the liquid coolant flowing through the spindle of the machine tool is performed with the flow-variation and temperature-variation controls according to the timely detected operating parameters of the machine tool, and the solenoid valve is turned off to prevent the liquid coolant flowing through the spindle from flowing back to the cooler during the loading/unloading process or the warm-up of the machine tool. By doing so, the spindle temperature can be timely adjusted according to the operating parameters of the machine tool, which helps to reduce the thermal deformation of the spindle while switching between the high and low load processes so as to provide a high accuracy of controlling the thermal deformation and to achieve a warm-up in a faster manner and an energy-saving effect.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A temperature control system, adapted to a machine tool, the temperature control system comprising:
   a cooling circulation, comprising;
      a pump, driven by a variable frequency motor so as to drive a liquid coolant to flow in the cooling circulation and to flow through a spindle of the machine tool;
      a cooler, serially connected to the pump to cool the liquid coolant; and
      a solenoid valve, connected to an inlet and an outlet of the cooler, wherein when the solenoid valve is turned on, the liquid coolant flowing through the spindle does not flow back to the cooler; when the solenoid valve is turned off, the liquid coolant is only pumped through the pump and the cooler; and
      a controller, electrically connected to the variable frequency motor, the cooler, and the solenoid valve, the controller adapted to be connected to the machine tool to detect a spindle load, a spindle speed, a spindle temperature and a body temperature of the machine tool in order to control the variable frequency motor, the cooler and the solenoid valve.

2. The temperature control system according to the claim 1, wherein the controller is further adapted to control the cooler to cool the liquid coolant according to a temperature difference between the spindle temperature and the body temperature, and to calculate a speed of the variable frequency motor to control a flow rate of the liquid coolant using a regression equation according to the spindle load, the spindle speed and the temperature difference.

3. The temperature control system according to the claim 1, wherein the controller is further adapted to determine whether the spindle temperature falls within a working temperature interval; when the spindle temperature is determined to be falling outside the working temperature interval, the controller turns on the solenoid valve; when the spindle temperature is determined to be falling within the working temperature interval, the controller turns off the solenoid valve so that the liquid coolant is allowed to flow to the cooler; wherein the working temperature interval is related to the body temperature.

4. The temperature control system according to the claim 3, wherein when the spindle temperature is determined to be falling outside the working temperature interval, the controller turns off the cooler; when the spindle temperature is determined to be falling within the working temperature interval, the controller turns on the cooler.

5. The temperature control system according to the claim 1, wherein when the controller detects that the spindle speed is zero, the controller records an operation time where the spindle speed is zero; when the controller detects that the operation time is longer than a predetermined time period, the controller turns on the solenoid valve.

6. The temperature control system according to the claim 5, wherein the predetermined time period is a first predetermined time period; when the controller detects that the operation time is longer than a second predetermined time period which is longer than the first predetermined time period, the controller turns off the cooler.

7. A temperature control method, adapted to a temperature control system so as to control a variable frequency motor to drive a pump to drive a liquid coolant to flow through a spindle of a machine tool, the temperature control method comprising:
  detecting a spindle load, a spindle speed, a spindle temperature and a body temperature of the machine tool;
  controlling a cooler to cool the liquid coolant according to a temperature difference between the spindle temperature and the body temperature; and
  calculating a speed of the variable frequency motor to control a flow rate of the liquid coolant using a regression equation according to the spindle load, the spindle speed and the temperature difference.

8. The temperature control method according to the claim 7, wherein before controlling the cooler to cool the liquid coolant and controlling the flow rate of the liquid coolant, further comprises:
  determining whether the spindle temperature falls within a working temperature interval, wherein the working temperature interval is related to the body temperature;
  turning on the solenoid valve so that the liquid coolant flowing through the spindle does not flow back to the cooler when the spindle temperature is determined to be falling outside the working temperature interval; and
  turning off the solenoid valve so that the liquid coolant in the cooler flows through the spindle when the spindle temperature is determined to be falling within the working temperature interval.

9. The temperature control method according to the claim 8, further comprising:
  turning off the cooler when the spindle temperature is determined to be falling outside the working temperature interval; and
  turning on the cooler when the spindle temperature is determined to be falling within the working temperature interval.

10. The temperature control method according to the claim 7, further comprising:
  recording an operation time while the spindle speed is detected to be zero; and
  turning on the solenoid valve when the operation time is detected to be longer than a predetermined time period.

11. The temperature control method according to the claim 10, wherein the predetermined time period is a first predetermined time period, and the temperature control method further comprises:
  turning off the cooler when the operation time is longer than a second predetermined time period which is longer than the first predetermined time period.

* * * * *